(12) United States Patent
Minh Le et al.

(10) Patent No.: US 10,639,861 B2
(45) Date of Patent: May 5, 2020

(54) SOLE MOLD FOR MANUFACTURING A SOLE

(71) Applicant: adidas AG, Herzogenaurach (DE)

(72) Inventors: Tru Huu Minh Le, Herzogenaurach (DE); Christopher Robertson, Herzogenaurach (DE); Christopher Edward Holmes, Herzogenaurach (DE); Norbert Reuber, Herzogenaurach (DE); Maximilian Philipp Kurtz, Herzogenaurach (DE); Rene Hubert, Herzogenaurach (DE); Christian Richardt, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 275 days.

(21) Appl. No.: 15/602,505

(22) Filed: May 23, 2017

(65) Prior Publication Data

US 2017/0341325 A1 Nov. 30, 2017

(30) Foreign Application Priority Data

May 24, 2016 (DE) .......................... 10 2016 209 044

(51) Int. Cl.
*B29D 35/00* (2010.01)
*B29D 35/12* (2010.01)
(Continued)

(52) U.S. Cl.
CPC .......... *B29D 35/0063* (2013.01); *A43B 13/04* (2013.01); *B29D 35/122* (2013.01); *B29D 35/128* (2013.01); *B29D 35/142* (2013.01); *B33Y 80/00* (2014.12); *B29K 2075/00* (2013.01); *B29K 2105/04* (2013.01); *B29K 2105/251* (2013.01); *B29L 2031/504* (2013.01)

(58) Field of Classification Search
CPC .............. B29D 35/0063; B29D 35/122; B29D 35/128; B29D 35/142
See application file for complete search history.

(56) References Cited

U.S. PATENT DOCUMENTS 1,855,098 A 4/1932 Collins
3,315,317 A 4/1967 Winkler
(Continued)

FOREIGN PATENT DOCUMENTS

AT 505333 12/2008
CN 1087573 6/1994
(Continued)

OTHER PUBLICATIONS

Partial machine translation of JP 11-129275 A dated May 1999 obtained from the espace website. (Year: 1999).*
(Continued)

*Primary Examiner* — Robert B Davis
(74) *Attorney, Agent, or Firm* — Kilpatrick Townsend & Stockton LLP

(57) ABSTRACT

A sole mold for manufacturing a sole from a plurality of particles includes at least one first opening for supplying the particles, and at least two second openings for supplying a gaseous and/or liquid medium to bond and/or fuse the particles together. At least a portion of the sole mold is manufactured by an additive manufacturing method.

19 Claims, 6 Drawing Sheets

(51) Int. Cl.
  *B33Y 80/00*     (2015.01)
  *A43B 13/04*      (2006.01)
  *B29D 35/14*    (2010.01)
  *B29L 31/50*       (2006.01)
  *B29K 75/00*       (2006.01)
  *B29K 105/04*      (2006.01)
  *B29K 105/00*      (2006.01)

(56) References Cited

U.S. PATENT DOCUMENTS

| | | | |
|---|---|---|---|
| 3,424,827 | A | 1/1969 | Galizia et al. |
| 3,813,201 | A | 5/1974 | Frederick et al. |
| 4,902,721 | A | 2/1990 | Pham et al. |
| 5,314,927 | A * | 5/1994 | Kondo .................. B32B 27/10 521/159 |
| 5,518,060 | A | 5/1996 | Bilderback et al. |
| 5,667,737 | A | 9/1997 | Wittmann |
| 5,736,167 | A | 4/1998 | Chang |
| 5,937,265 | A | 8/1999 | Pratt et al. |
| 6,432,320 | B1 | 8/2002 | Bonsignore et al. |
| 6,464,922 | B1 | 10/2002 | Bogdan |
| 6,800,227 | B1 * | 10/2004 | Nohara ................ B29C 44/445 264/126 |
| D709,680 | S | 7/2014 | Herath |
| 8,958,901 | B2 | 2/2015 | Regan |
| D740,003 | S | 10/2015 | Herath |
| D740,004 | S | 10/2015 | Hoellmueller et al. |
| 9,212,270 | B2 | 12/2015 | Fuessi et al. |
| D758,056 | S | 6/2016 | Herath et al. |
| D776,410 | S | 1/2017 | Herath et al. |
| D783,264 | S | 4/2017 | Hoellmueller et al. |
| 9,610,746 | B2 | 4/2017 | Wardlaw et al. |
| 9,681,709 | B2 | 6/2017 | Lott et al. |
| 2001/0013459 | A1 | 8/2001 | Pattantyus-abraham et al. |
| 2001/0048182 | A1 | 12/2001 | Caretta et al. |
| 2002/0170650 | A1 | 11/2002 | Chi et al. |
| 2004/0032042 | A1 | 2/2004 | Chi |
| 2005/0110183 | A1 | 5/2005 | Buchel et al. |
| 2005/0144034 | A1 | 6/2005 | Hunter |
| 2006/0043645 | A1 * | 3/2006 | Goettsch ................ B29C 45/34 264/400 |
| 2007/0029698 | A1 | 2/2007 | Rynerson et al. |
| 2008/0277837 | A1 | 11/2008 | Liu et al. |
| 2009/0013558 | A1 | 1/2009 | Hazenberg et al. |
| 2009/0072436 | A1 * | 3/2009 | Dean .................... B29C 33/306 264/219 |
| 2011/0232008 | A1 | 9/2011 | Crisp |
| 2012/0056345 | A1 | 3/2012 | Lee et al. |
| 2013/0125319 | A1 | 5/2013 | Regan |
| 2013/0126075 | A1 | 5/2013 | Jiang et al. |
| 2013/0150468 | A1 | 6/2013 | Fuessi et al. |
| 2013/0266792 | A1 | 10/2013 | Nohara et al. |
| 2013/0291409 | A1 | 11/2013 | Reinhardt et al. |
| 2013/0333950 | A1 | 12/2013 | Atkins et al. |
| 2014/0017450 | A1 | 1/2014 | Baghdadi et al. |
| 2014/0189964 | A1 | 7/2014 | Wen et al. |
| 2014/0223776 | A1 | 8/2014 | Wardlaw et al. |
| 2014/0223777 | A1 | 8/2014 | Whiteman et al. |
| 2014/0223783 | A1 | 8/2014 | Wardlaw et al. |
| 2014/0227505 | A1 | 8/2014 | Schiller et al. |
| 2014/0243442 | A1 | 8/2014 | Coles et al. |
| 2014/0259753 | A1 | 9/2014 | Watkins et al. |
| 2014/0275306 | A1 | 9/2014 | Watkins et al. |
| 2014/0366403 | A1 | 12/2014 | Reinhardt et al. |
| 2014/0366404 | A1 | 12/2014 | Reinhardt et al. |
| 2014/0366405 | A1 | 12/2014 | Reinhardt et al. |
| 2015/0101133 | A1 | 4/2015 | Manz et al. |
| 2015/0101134 | A1 | 4/2015 | Manz et al. |
| 2015/0119482 | A1 | 4/2015 | Kumar et al. |
| 2015/0166270 | A1 | 6/2015 | Buscher et al. |
| 2015/0174808 | A1 | 6/2015 | Rudolph et al. |
| 2015/0197617 | A1 | 7/2015 | Prissok et al. |
| 2015/0237823 | A1 | 8/2015 | Schmitt et al. |
| 2015/0344661 | A1 | 12/2015 | Spies et al. |
| 2015/0366289 | A1 | 12/2015 | Rustam et al. |
| 2016/0001476 | A1 * | 1/2016 | Sommer ............ B29C 44/3496 264/54 |
| 2016/0037859 | A1 | 2/2016 | Smith et al. |
| 2016/0044992 | A1 | 2/2016 | Reinhardt et al. |
| 2016/0046751 | A1 | 2/2016 | Spies et al. |
| 2016/0121524 | A1 | 5/2016 | Daeschlein et al. |
| 2016/0128426 | A1 | 5/2016 | Reinhardt et al. |
| 2016/0278481 | A1 | 9/2016 | Le et al. |
| 2016/0295955 | A1 | 10/2016 | Wardlaw et al. |
| 2016/0302508 | A1 | 10/2016 | Kormann et al. |
| 2016/0346627 | A1 | 12/2016 | Le et al. |
| 2017/0173910 | A1 | 6/2017 | Wardlaw et al. |
| 2017/0340067 | A1 | 11/2017 | Dyckmans et al. |
| 2017/0341326 | A1 | 11/2017 | Holmes et al. |
| 2017/0341327 | A1 | 11/2017 | Le et al. |

FOREIGN PATENT DOCUMENTS

| | | |
|---|---|---|
| CN | 105209233 | 12/2015 |
| CN | 105520278 | 4/2016 |
| DE | 1729011 | 6/1971 |
| DE | 3032246 | 4/1982 |
| DE | 3437786 | 4/1986 |
| DE | 19633467 | 2/1998 |
| DE | 19648804 | 5/1998 |
| DE | 19654860 | 5/1998 |
| DE | 19704700 | 9/1998 |
| DE | 19860611 | 3/2000 |
| DE | 102004049060 | 6/2005 |
| DE | 102004028462 | 12/2005 |
| DE | 202006009569 | 8/2006 |
| DE | 202007006164 | 9/2007 |
| DE | 102006024940 | 12/2007 |
| DE | 102007054723 | 5/2009 |
| DE | 102009030678 | 4/2010 |
| DE | 102009004386 | 7/2010 |
| DE | 202011109598 U1 | 2/2012 |
| DE | 102011108744 | 1/2013 |
| DE | 102013012515 | 3/2014 |
| DE | 102013002519 | 8/2014 |
| DE | 102013108053 | 1/2015 |
| DE | 102013221018 | 4/2015 |
| DE | 102013221020 | 4/2015 |
| DE | 102014107847 | 12/2015 |
| DE | 102015202014 | 8/2016 |
| DE | 102015224885 | 6/2017 |
| EP | 0790010 | 8/1997 |
| EP | 0976518 A2 | 2/2000 |
| EP | 1016354 | 7/2000 |
| EP | 1259365 | 11/2002 |
| EP | 1535714 A2 | 6/2005 |
| EP | 1990170 | 11/2008 |
| EP | 2564719 | 3/2013 |
| EP | 2649896 | 10/2013 |
| EP | 2684665 | 1/2014 |
| EP | 2764972 | 8/2014 |
| EP | 2767181 | 8/2014 |
| EP | 2786670 | 10/2014 |
| EP | 2845504 | 3/2015 |
| EP | 2984956 | 2/2016 |
| EP | 2767183 | 4/2017 |
| GB | 1063353 | 3/1967 |
| GB | 1439101 | 6/1976 |
| JP | 50155569 | 12/1975 |
| JP | 54114354 | 9/1979 |
| JP | 55129004 | 10/1980 |
| JP | 5620402 | 2/1981 |
| JP | 57005009 | 1/1982 |
| JP | 57180653 | 11/1982 |
| JP | 5821304 | 2/1983 |
| JP | 61-41402 | 2/1986 |
| JP | 6374629 | 4/1988 |
| JP | 6046483 | 6/1994 |
| JP | H08-131209 | 5/1996 |
| JP | 08239570 | 9/1996 |
| JP | 3047622 | 9/1997 |
| JP | H09-322803 | 12/1997 |
| JP | 11129275 A * | 5/1999 |

(56) References Cited

FOREIGN PATENT DOCUMENTS

| | | |
|---|---|---|
| JP | H11129275 | 5/1999 |
| JP | 11291275 | 10/1999 |
| JP | 2000-037208 | 2/2000 |
| JP | 2000-190394 | 7/2000 |
| JP | 2000-279205 | 10/2000 |
| JP | 2002-119302 | 4/2002 |
| JP | 2002-144366 | 5/2002 |
| JP | 2003135105 | 5/2003 |
| JP | 2003-310302 | 11/2003 |
| JP | 2006-137032 | 6/2006 |
| JP | 2007504977 | 3/2007 |
| JP | 2008-544009 | 12/2008 |
| JP | 2009-518495 | 5/2009 |
| JP | 2014158708 | 9/2014 |
| JP | 2014-531352 | 11/2014 |
| WO | 9420568 | 9/1994 |
| WO | 99/55186 | 11/1999 |
| WO | 2005/026243 | 3/2005 |
| WO | 2005066250 | 7/2005 |
| WO | 2007082838 | 7/2007 |
| WO | 2008087078 | 7/2008 |
| WO | 2009036240 | 3/2009 |
| WO | 2009-146368 | 12/2009 |
| WO | 2011/125540 | 10/2011 |
| WO | 2011/134996 | 11/2011 |
| WO | 2012065926 | 5/2012 |
| WO | 2014046940 | 3/2014 |
| WO | 2014150122 | 9/2014 |
| WO | 2015052265 | 4/2015 |
| WO | 2015052267 | 4/2015 |
| WO | 2015/075546 | 5/2015 |

OTHER PUBLICATIONS

Abstract and figure of CN-205021904 U dated Feb. 2016. (Year: 2016).*
European Patent Application No. 17172474.3 , Extended European Search Report dated Oct. 6, 2017, 9 pages.
Unpublished U.S. Appl. No. 15/581,112, filed Apr. 28, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 15/595,291, filed May 15, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 29/591,016, filed Jan. 16, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 29/592,935, filed Feb. 3, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 29/592,946, filed Feb. 3, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 29/594,228, filed Feb. 16, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 29/594,358, filed Feb. 17, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 29/595,852, filed Mar. 2, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 29/595,857, filed Mar. 2, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 29/595,859, filed Mar. 2, 2017. In accordance with the Waiver of the Copy Requirements in 37 CFR 1.98 for Cited Pending U.S. Patent Applications, 1287 O.G. 163 (Oct. 19, 2004).
Unpublished U.S. Appl. No. 62/137,139, filed Mar. 23, 2016. In accordance with the Waiver of the Copy Requirements in 37 CFR 1.98 for Cited Pending U.S. Patent Applications, 1287 O.G. 163 (Oct. 19, 2004).
German Patent Application No. DE102016209044.5 , "Office Action", dated Jan. 9, 2017—8 pages (No English translation available. A summary of the Office Action is provided in the Transmittal Letter submitted herewith).
Japanese Patent Application No. 2017-101565, Office Acton dated Oct. 23, 2018, 9 pages (4 pages of translation and 5 pages of original document).
European Extended Search Report, European Patent Application No. 19175622.0, dated Jul. 25, 2019, 10 pages.
Office Action, Chinese Patent Application No. 201710367932.3, dated Jul. 15, 2019, 10 pages.
Office Action, Chinese Patent Application No. 201710367932.3, dated Dec. 5, 2018, 11 pages.
Decision to Grant, European Patent Application No. 17172474.3, dated Apr. 26, 2019.
Decision to Grant, Japanese Patent Application No. 2017-101565, dated Aug. 13, 2019.
Decision to Grant, German Patent Application No. 102016209044, dated May 30, 2019.

* cited by examiner

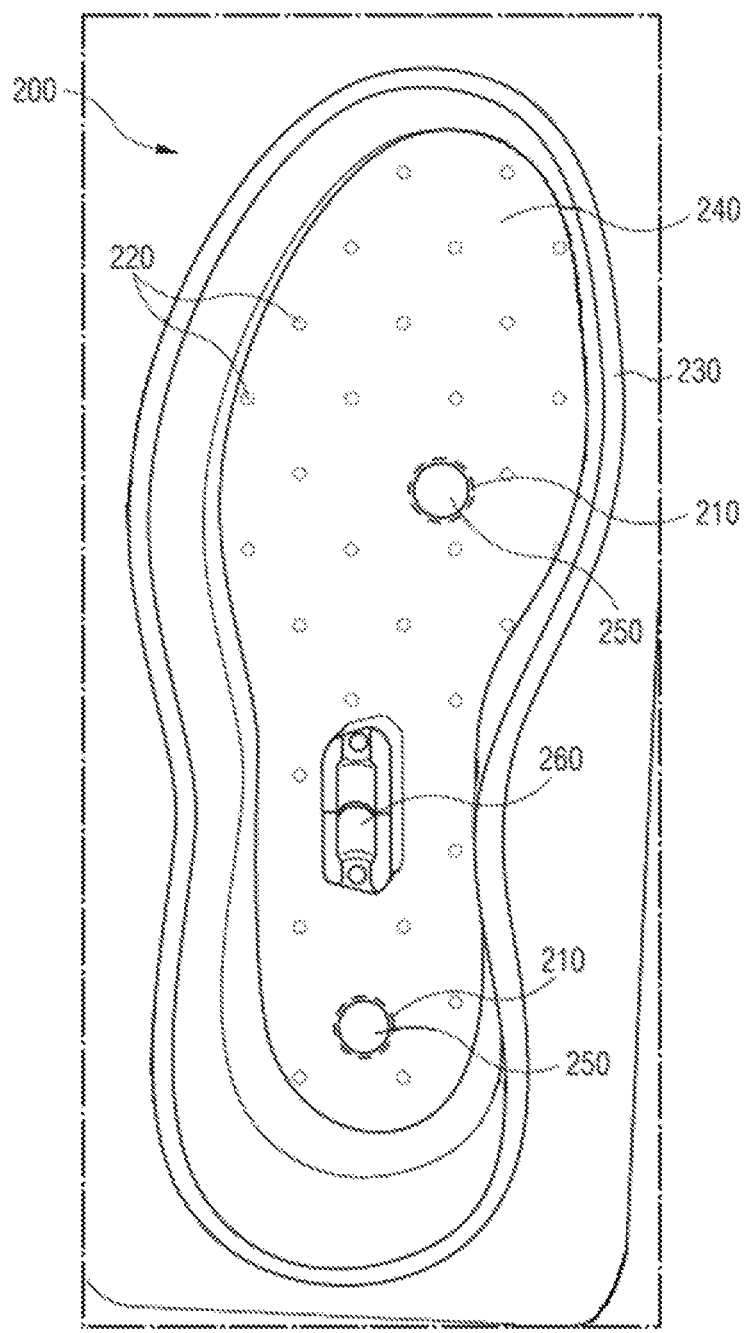

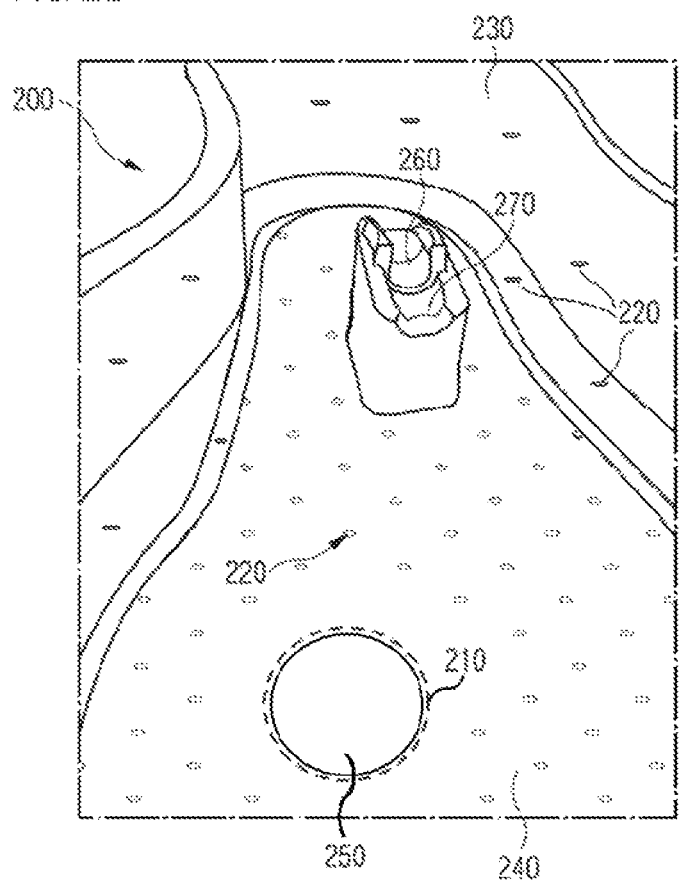

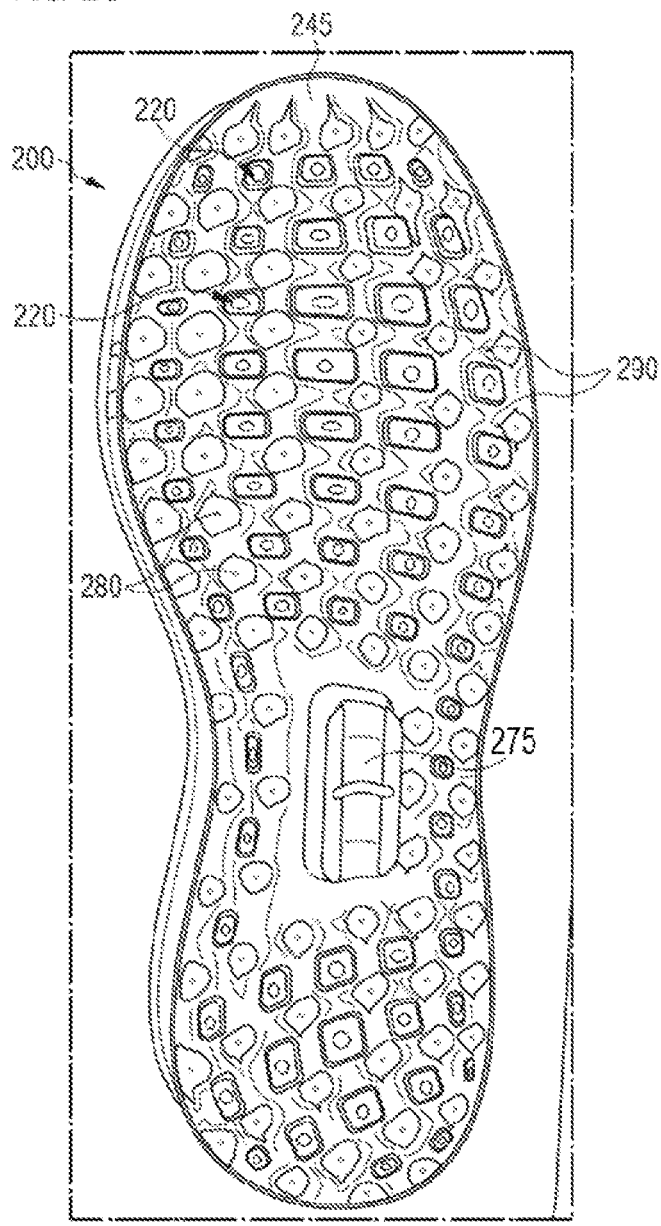

SOLE MOLD FOR MANUFACTURING A SOLE

CROSS REFERENCE TO RELATED APPLICATION

This application is related to and claims priority benefits from German Patent Application No. DE 10 2016 209 044.5, filed on May 24, 2016 and entitled SOLE MOLD FOR MANUFACTURING A SOLE, the content of which is hereby incorporated herein in its entirety by this reference.

FIELD OF THE INVENTION

The present invention relates to a sole mold for manufacturing a sole from a plurality of particles.

BACKGROUND

Shoes soles, in particular midsoles, are usually manufactured from polymers such as ethylene-vinyl acetate (EVA). A standard manufacturing process for such polymers comprises injection molding the sole material into a conventional sole mold.

As the requirements on shoe soles, in particular for sport shoes, become more challenging in order to provide improved performance properties, in particular enhanced cushioning properties, new sole materials have been developed. For example, applicant disclosed in EP 2 786 670, EP 2 767 183, EP 2 767 181, EP 2 845 504 deformation elements for shoe soles comprising a plurality of randomly arranged particles.

However, conventional molds for molding a shoe sole are not adapted to the specific requirements when molding a shoe sole made from particles. For example, the particle molding process with a conventional mold requires a large amount of energy for heating the mold, as conventional molds typically have a high mass. Moreover, the cooling process of such molds is slow and therefore leads to extended cycle times. Finally, molding soles from particles requires to uniformly supplying a gaseous or liquid medium to the particles in order to achieve a homogeneous interconnection of the particles. Conventional molds are not adapted to such a uniform medium supply.

The US 2008/0277837 discloses gas permeable molds and mold segments having open porosity. Blind vents in the mold wall's outside surface allow for an uninterrupted molding surface while enhancing the gas permeability provided by the open porosity. Methods of making such gas permeable molds include forming them from laser-sintered materials. Other molds are known from US 2007/0029698, US 2013/0333950, US 2001/0048182, U.S. Pat. Nos. 5,937,265 and 5,518,060.

Further prior art is disclosed in DE 10 2013 002 519 A1, DE 10 2007 054 723 B4, DE 10 2004 028 462 A1, DE 197 04 700 C1, DE 10 2014 107 847 A1, EP 2 684 665 A2 and DE 10 2009 030 678 A1.

Therefore, the underlying problem of the present invention is to provide a sole mold that is capable to at least partly overcome the above-mentioned deficiencies of conventional sole molds for molding shoe soles from particles.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a sole mold comprises at least one first opening for supplying the particles, at least two second openings for supplying a gaseous and/or liquid medium to bond and/or fuse together the particles, wherein at least a portion of the sole mold is manufactured by an additive manufacturing method.

In some embodiments, each of the at least two second openings have a smaller length than the average size of the particles to be molded in the sole mold in at least one dimension. In certain embodiments, the at least two second openings are provided with a largest dimension of up to 5.0 mm.

In various embodiments, the sole mold may further comprise three-dimensional textures on the internal surface to provide structural features to the midsole surface.

According to some embodiments, at least a portion of the sole mold comprises a thickness of equal or less than 10 mm. Such a portion may optionally be provided in the side wall of the sole mold. In certain embodiments, the portion may comprise substantially the complete mold.

According to various embodiments, the sole mold comprises a top part, a bottom part and a side wall, wherein second openings are provided in the side wall. In some embodiments, the second openings may be provided in the top part, the bottom part and the side wall.

In some embodiments, the sole mold further comprises at least one recess and/or at least one projection to position a pre-manufactured outsole in the mold. The second openings may be arranged adjacent to the at least one recess and/or at least one projection.

In certain embodiments, the second openings are arranged in an essentially regular pattern.

In various embodiments, the sole mold further comprises a means for closing the at least first opening.

According to some embodiments, the sole mold comprises a means for holding a supporting element inside the mold. The sole mold may further comprise at least one means for ejecting a manufactured sole form the sole mold.

According to certain embodiments, an arrangement of a plurality of sole molds is provided.

BRIEF DESCRIPTION OF THE DRAWINGS

Possible embodiments of the present invention are further described in the following detailed description, with reference to the following figures:

FIG. 2*a* is a top view of a top part of a sole mold according to aspects of the present disclosure.

FIG. 2b is an enlarged perspective view of the sole mold of FIG. 2a.

FIG. 2c is a top view of a bottom part of a sole mold according to aspects of the present disclosure.

BRIEF DESCRIPTION

Figure 1:
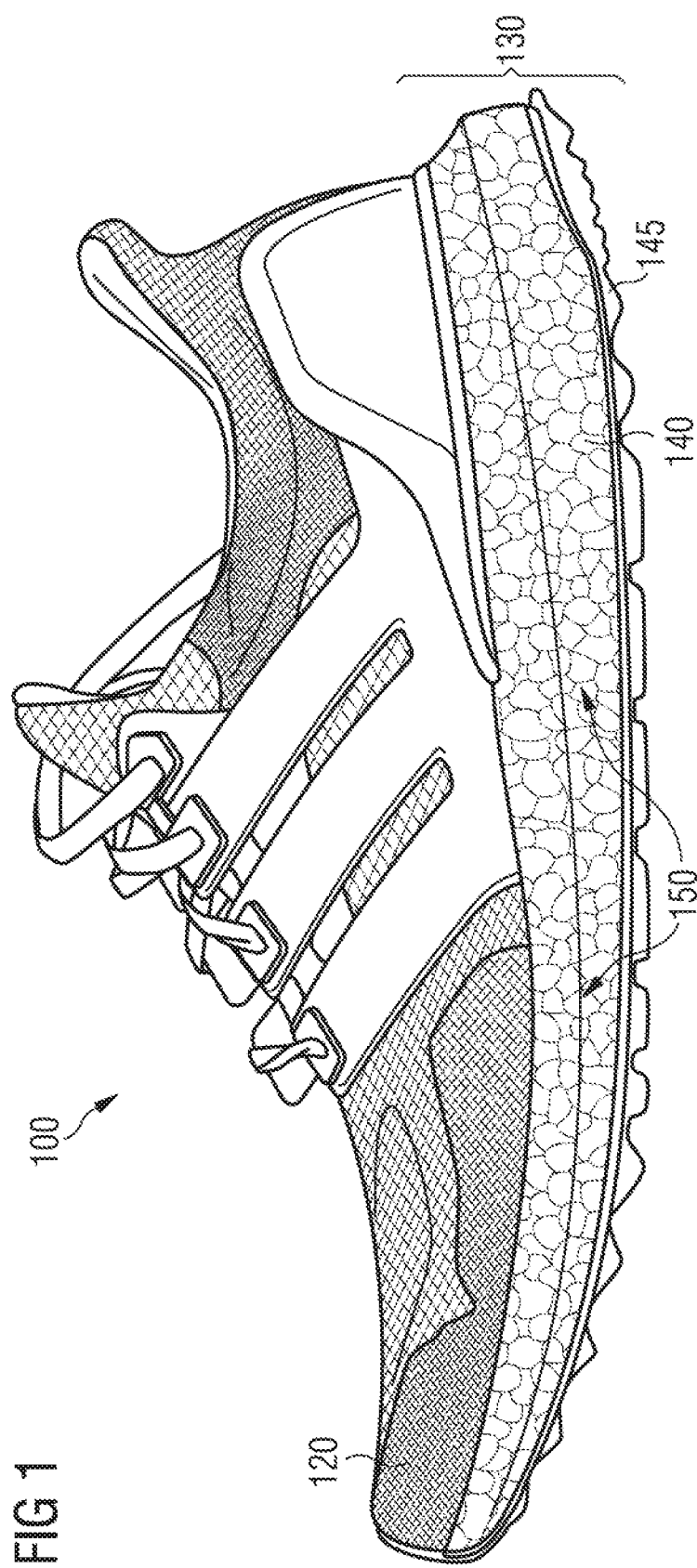
FIG. 1 is a side view of a shoe including a sole comprising a midsole manufactured from a plurality of particles according to aspects of the present disclosure.

The above mentioned problem is at least partly solved by a sole mold according to the present invention. In one embodiment, the sole mold comprises (a) at least one first opening for supplying the particles, (b) at least two second openings for supplying a gaseous and/or liquid medium to bond and/or fuse together the particles, (c) wherein at least a portion of the sole mold is manufactured by an additive manufacturing method.

The inventors have found that such a sole mold provides a fundamentally new approach for shoe soles made by particle molding. By using an additive manufacturing method the mass of the sole mold can be significantly reduced without deteriorating the sole mold's stability during the molding process. As a consequence, the heat capacity of the mold is also significantly reduced and therefore also the loss of energy when heating the mold. The reduced mass of the sole mold also improves the cooling process as the reduced heat capacity will accelerate the cooling, which is further supported by the open structure of the mold that can be provided by additive manufacturing. All of this leads to reduced cycle times when manufacturing a plurality of shoe soles with the sole mold of the present invention.

The additive manufacturing of the mold also enables the provision of customized/optimized and/or fine structures on the surface of the sole mold, for example, a high number of small second openings wherein up to 50%, preferably up to 60% and more preferably up to 70% of the surface may be provided with such openings. A well-defined distribution of such second openings may improve the homogenous distribution of the inflow of the gaseous and/or liquid medium, such as steam. As a result, a uniform supplying of the gaseous and/or liquid medium may be achieved so that the particles of the sole are uniformly interconnected leading to a high quality shoe sole.

In one embodiment, each of the at least two second openings have a smaller length than the average size of the particles to be molded in the sole mold in at least one dimension. For example, the at least two second openings are provided with a biggest dimension of up to 5.0 mm, preferably of up to 4.0 mm, preferably up to 3.0 mm and more preferably 0.1 mm to 1 mm. Second openings with such dimensions provide a reasonable compromise between an effective supply of liquid and/or gas without having large unsupported surface regions in the mold, which could lead to uneven surfaces of the final sole. Moreover, it has been found that such second openings may also favorably contribute to the reduction of the cycle time of the molding process by further reducing the heat capacity of the mold. Finally, such dimensions of the second openings avoid production waste as essentially no particles can leave the sole mold through the second openings.

In one embodiment, the sole mold may further comprise three-dimensional textures on the internal surface to provide structural features to the midsole surface. Such features can comprise, by way of example only, contoured lines, indented lines, patterns and other such design elements known to the person skilled in the art.

In one embodiment, at least a portion of the sole mold comprises a thickness of equal or less than 10 mm, preferably equal or less than 6 mm and more preferably equal or less than 3 mm. Such a portion may for example be provided in the side wall of the sole mold. In a more specific embodiment, the portion may comprise essentially the complete mold. In this context and also in the following, the term "essentially" refers to typical product tolerances in the technical field of the present invention.

The indicated values for the thickness and for the dimensions of the second openings can be easily achieved by additive manufacturing. They have been found to provide a reasonable compromise between the conflicting requirements to reduce the heat capacity of the mold and to provide sufficient stability so that the mold can permanently resist the pressure and thermal stress during molding.

In one embodiment, the sole mold comprises a top part, a bottom part and a side wall, wherein second openings are provided in the side wall. In a more specific embodiment, the second openings may be provided in the top part, the bottom part and the side wall.

Such an arrangement of the second openings may improve the supply of the gaseous and/or liquid medium to bond and/or fuse the particles. This may lead to a sole having even more homogeneous properties as the bonding/fusing together of the particles does not significantly vary throughout the sole. The inflow of the medium through the second openings in the top part, the bottom part and/or the side wall may be selectively controlled. For example, the medium may be supplied through the second openings in the top part and in the bottom part and may be removed by the second openings in the side wall or vice versa.

In one embodiment, the sole mold further comprises at least one recess and/or at least one projection to position a pre-manufactured outsole in the mold. The second openings may be arranged adjacent to the at least one recess and/or at least one projection. The sole mold according to such an embodiment allows combining in a single processing step the molding of a midsole from particles with the bonding of the midsole to the outsole. To this end, the outsole may be placed within one or more recesses and/or positioned by means of one or more projections of the mold. The particles may then be supplied by the at least first opening, bonded and/or fused together by the gaseous and/or liquid medium from the second openings in order to form the midsole, wherein they are simultaneously connected to the pre-manufactured outsole.

In one embodiment, the second openings are arranged in an essentially regular pattern. The inventors have found that an essentially regular pattern may provide a high quality of the molded particles as essentially the same amount of energy provided by the gaseous and/or liquid medium can be absorbed by the particles throughout the sole area corresponding to the regular pattern.

In one embodiment, the sole mold further comprises a means for closing the at least first opening.

In one embodiment, the sole mold comprises a means for holding a supporting element inside the mold. The sole mold may further comprise at least one means for ejecting a manufactured sole form the sole mold. For example, the top part and/or the bottom part of the mold may include means for holding a supporting element, which is thus placed inside the particles so that it is at least partially encompassed in the molded sole and can thus improve the stability of the final shoe sole. The ejecting means may support an automation of the molding process, as the manufactured sole may be automatically ejected after molding for further processing.

According to another aspect, the present invention is directed to an arrangement of a plurality of sole molds according to the invention. Combining several molds may allow to automatically manufacture a plurality of shoe soles in a single production step. Moreover, the infrastructure to supply the molds with the gaseous and/or liquid medium may be shared among several molds leading to lower overall costs for the automated manufacture of a large number of shoe soles.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Possible embodiments and variations of the present invention are described in the following with particular reference to a sole mold. However, the concept of the present invention may identically or similarly be applied to any mold for molding particles.

Moreover, for brevity only a limited number of embodiments are described in the following. However, the skilled person will recognize that the specific features described with reference to these embodiments may be modified and combined differently and that certain aspects of the specific embodiments may also be omitted. Moreover, it is noted that the aspects described in the subsequent detailed description may be combined with aspects described in the above summary section.

FIG. 1 presents a side view of a shoe 100 providing improved performance properties, in particular enhanced cushioning properties. The shoe 100 comprises a shoe upper 120 and a sole 140. As can be seen, the sole 140 comprises an outsole 145 and a midsole 130. The midsole 130 is manufactured from a large number of particles 150. The particles 150 may be made from an expanded material such as expanded thermoplastic polyurethane. It is also conceivable that any other appropriate material may be used, for example, any other particle foam suitable for the manufacture of shoe soles, for example, ePEBA (expanded polyetherblockamide) or ePA (expanded polyamide). Moreover, the expanded particles 150 may be randomly arranged or with a certain pattern inside the midsole 130.

FIGS. 2a-2c present certain parts of an exemplary embodiment for a sole mold 200. FIG. 2a shows a top view of a top part 240 and side wall 230 of the sole mold 200; FIG. 2b shows a more detailed view of FIG. 2a and finally FIG. 2c shows a top view of a corresponding bottom part 245 of the sole mold 200.

As can be seen in FIG. 2a, the sole mold 200 comprises at least one first opening 210 for supplying the particles. In the embodiment of FIG. 2a, two first openings 210 (indicated with dashed circles) are arranged in the top part 240 of the sole mold 200. It is also conceivable that more than two first openings 210 are provided in order to accelerate the supplying of the particles into the mold. In addition, it is also possible that the first openings 210 are provided with different shapes or simply by opening a gap between a lower and an upper part and/or the sidewall of the mold. Moreover, the at least first openings 210 may also be arranged in other parts of the sole mold 200.

The sole mold 200 further comprises at least two second openings 220 for supplying a gaseous and/or liquid medium to bond and/or fuse together the particles, wherein at least a part of the sole mold 200 is manufactured by an additive manufacturing method. Additive manufacturing can create very fine structures that cannot be obtained by traditional mold production techniques, or which are at least difficult or costly to produce. One advantage is therefore that the mass of the sole mold 200 can be significantly reduced without endangering the sole mold's stability during the molding process. As a consequence, a lower heat capacity of the sole mold 200 is obtained. This in turn reduces the loss of energy, when heating the mold 200 and also leads to a faster cooling process as the reduced heat capacity will accelerate the cooling of the sole mold 200 at the end of the process cycle.

In one embodiment, the additive manufacturing method may involve laser sintering. However, other additive manufacturing methods such as 3D printing, stereolithography (SLA), selective laser melting (SLM) or direct metal laser sintering (DMLS), selective laser sintering (SLS), fused deposition modeling (FDM), etc. can alternatively or in addition be used to make the sole mold 200.

The additive manufacturing of the sole mold 200 also enables to provide fine structures on the surface of the sole mold, for example a high number of small second openings 220 per surface unit. A precise distribution of such second openings 220 may improve the homogenous distribution of the inflow of the gaseous and/or liquid medium, such as steam. As a result, the particles of the sole are uniformly interconnected leading to a high quality shoe sole.

The gaseous and/or liquid medium to bond and/or fuse together the particles may be steam. Advantageously, steam is not expensive, relatively easy to handle and provides the necessary temperature for the bonding and/or fusing process of certain types of particles. Alternatively or in addition, it is also conceivable to provide the necessary energy by using a massless medium such as an electromagnetic wave.

In one embodiment, the at least two second openings 220 may also supply a gaseous and or/liquid medium to cool down the particles after molding. Moreover, the second openings might in one embodiment also serve to remove particles that have not been bonded/fused. This may further reduce the cycle time of the molding process.

In the embodiment of FIG. 2a, the second openings 220 are provided as a regular pattern of openings having a smaller length than the size of the particles, up to 5.0 mm, preferably up to 4.0 mm, preferably to 3.0 mm and more preferably 0.1 mm to 1 mm. Second openings 220 with such dimensions allow on the one hand the steam or any other medium to reach practically all particles of the sole to be molded. On the other hand individual particles or even a plurality thereof are not left without support in the mold, so that an unintended expansion of such particles into a larger second opening is avoided, which could cause an uneven sole surface. In addition, the waste of production may be reduced as fewer particles leave the sole mold through the second openings 220. Moreover, the dense pattern of second openings as shown in FIG. 2a may also favorably contribute to reduce cycle times of the molding process by removing mold material and thus further reducing the heat capacity of the mold.

The sole mold 200 further comprises at least a portion comprising a thickness of equal or less than 10 mm, preferably equal or less than 6 mm and more preferably equal or less than 3 mm. In the embodiment of FIGS. 2a and 2b, such a portion may be provided in the side wall 230 and in the top part 240 of the sole mold 200. Moreover, the bottom part 245 as presented in FIG. 2c may also be provided with such a portion. In fact, in one embodiment said portion may comprise essentially the complete mold 200. The indicated thickness values can be easily achieved and the materials can be easily processed by using an additive manufacturing.

In one embodiment, the portion may comprise stainless steel alloys, stainless hot-work steels, precipitation hardening stainless steels, tool steels, aluminum alloys, titanium alloys, commercially pure titanium, hot-work steels, bronze alloys, nickel based alloys, cobalt based alloys, in particular, cobalt chromium tungsten alloys, copper alloys, precious metal alloys. Alternatively or in addition, any other material or a mixture of at least two materials may be used provided the material(s) have appropriate properties such as durability and/or conductivity.

In the embodiment of FIGS. 2a and 2b, the second openings 220 are provided in the top part 240 and in the side wall 230. Alternatively, it is also possible that the second openings 220 may be provided only in the side wall 230. Such arrangements of the second openings 220 may provide a selective supply of the gaseous and/or liquid medium to bond and/or fuse together the particles. Moreover, the total inflow of the gaseous and/or liquid medium may be selectively controlled. For example, the medium may be supplied through the second openings 220 in the top part 240 and in the bottom part 245 and may be removed by the openings 220 in the side wall 230 or vice versa. This may lead to a sole having even more homogeneous properties as the bonding/fusing of the particles does not significantly vary throughout the sole. In addition, a maximum energy efficiency can be achieved in such an embodiment as the medium leaving the mold through a well-defined set of second openings might be at least partly recovered.

In the embodiment of FIG. 2a, the sole mold 200 further comprises means 250 for closing the two first openings 210.

The sole mold 200 further comprises a means 260 for holding a supporting element (not shown in the figures) inside the mold 200. In the embodiment of FIG. 2a, the means 260 for holding a supporting element is approximately centrally arranged in the mold 200 between the two first openings 210. Thus, the supporting element will be centrally arranged inside the manufactured sole. Moreover, by using the means for holding there may be no need of any adhesives in order to bond the supporting element with the particles of the sole. Alternatively or in addition, the means 260 for holding may be arranged in a heel portion and/or forefoot portion of the sole mold 200 depending on the desired performance characteristics for the sole. In addition, it is also possible to provide a plurality of means 260 for holding in order to provide more than one supporting element for the sole to be manufactured and thereby provide specific performance characteristics in certain parts of the sole.

FIG. 2b presents a more detailed view of the sole mold 200. In the embodiment of FIG. 2b, the side wall 230 of the sole mold 200 further comprises small second openings 220. These fine structures in the side wall 230 may be smaller than the second openings 220 in the top part 240 of the mold 200. Their sizes and distribution will determine the appearance of the sole and the final shoe, when looking from the side, as illustrated in FIG. 1. Such very small second openings would be extremely difficult to manufacture with standard mold manufacturing techniques. However, they are important as they may significantly improve the homogenous distribution of the inflow of the gaseous and/or liquid medium to bond and/or fuse together the particles of the sole.

In the embodiment of FIG. 2b, the means 260 for holding a supporting element inside the mold further comprises at least one means 270 for ejecting a manufactured sole from the sole mold 200. For example, the means 270 for ejecting may be at least one pin arranged at an end of the means 260 for holding. The pin may be positioned inside the means 260 for holding in a first position. A second position may be that the at least one pin extends out of the means 260 for holding and thus pushes the manufactured sole out of the sole mold 200. Alternatively or in addition, other means may be provided to remove the molded sole from the mold such as compressed air or even an automatic gripper.

FIG. 2c presents a top view of the bottom part 245 corresponding to the top part 240 as presented in FIGS. 2a and 2b. In the embodiment of FIG. 2c, further second openings 220 are provided on the surface of the bottom part 245. They may have the same or different shapes and dimensions compared to the second openings in the top part 240.

In the embodiment of FIG. 2c, the sole mold 200 further comprises at least one recess 280 and/or at least one projection 290. In such an embodiment, the plurality of recesses 280 and/or projections 290 may be arranged in such a way to form essentially the negative of a pre-manufactured outsole that can be positioned in the mold prior to the molding process. Second openings 220 may be arranged adjacent to the recesses 280 and/or projections 290 to supply uniformly the gaseous and/or liquid medium to bond and/or fuse together the particles in order to form the midsole, wherein the midsole is simultaneously connected to the pre-manufactured outsole positioned in the mold. Alternatively or in addition, the at least one recess 280 and/or the at least one projection 290 to position the pre-manufactured outsole may be provided in the top part of the sole mold 200. In any case a further optimized and automated process for manufacturing shoe soles can thus be provided.

The outsole may be pre-manufactured, for example by injection molding, compression molding, thermoforming, or any other methods of converting 2D design to 3D moldings known to the person skilled in the art. Alternatively, the outsole may at least partly be formed or molded in the bottom part of the mold of FIG. 2c. For example, a raw strip of outsole material can be positioned in the mold, which is then heated during molding of the particles and only then assumes the final outsole shape and at the same time connects to the molded particles.

In the embodiment of FIG. 2c, the sole mold 200 further comprises a further means 275 for holding a supporting element (not shown in the Figures) inside the sole mold 200 corresponding to the means 260 for holding in the top part 240 as presented in FIGS. 2a and 2b.

Figure 3A:
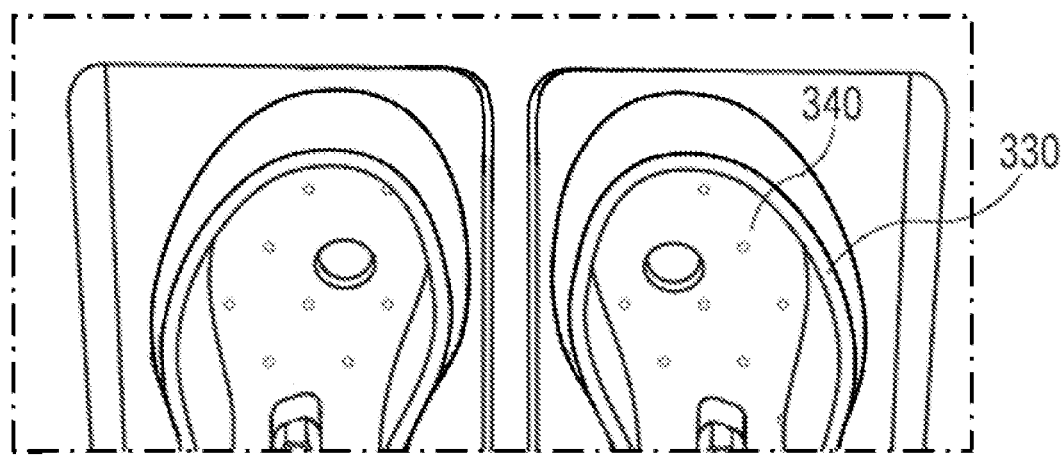
FIG. 3a shows the top part of an arrangement of a plurality of sole molds according to aspects of the present disclosure.
Figure 3B:
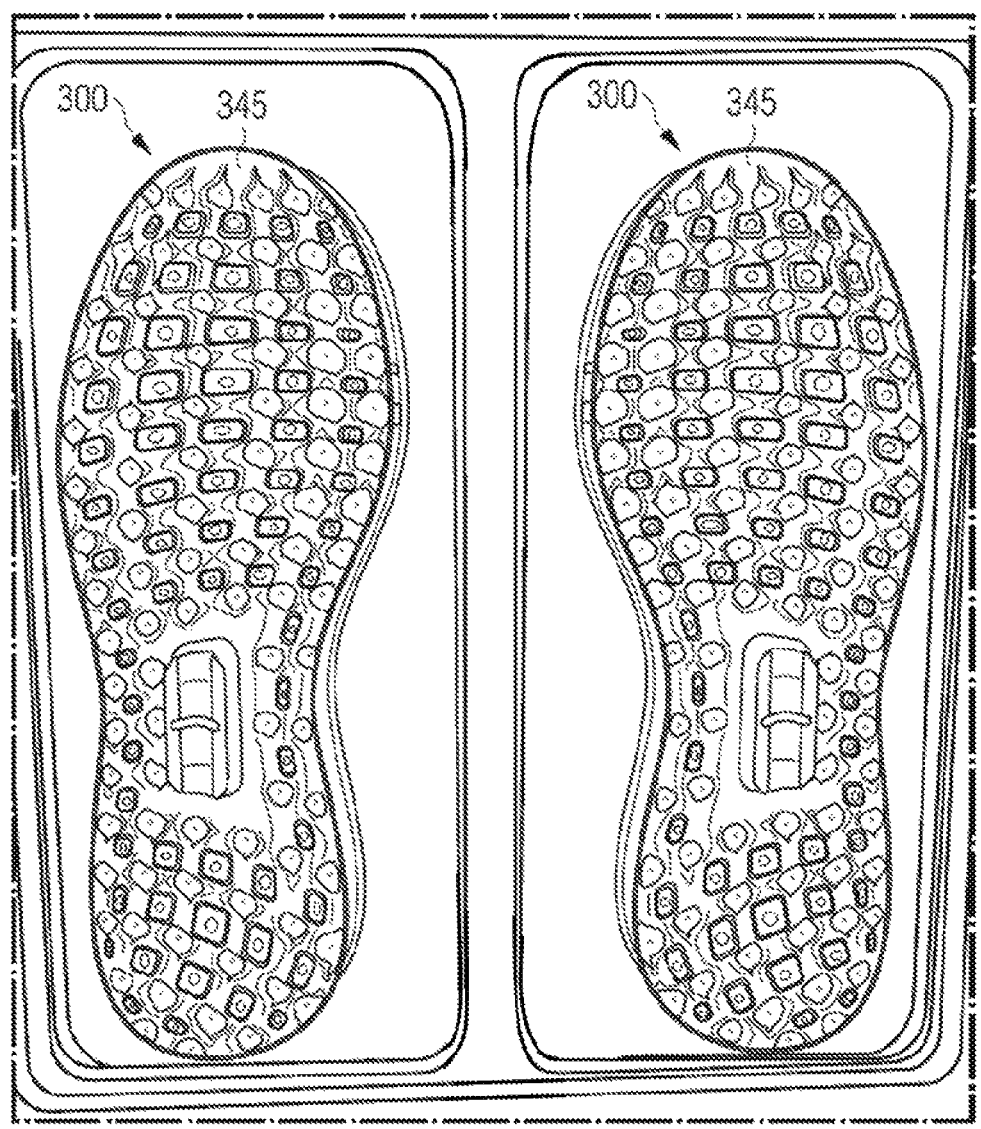
FIG. 3b shows the bottom part of the arrangement of sole molds of FIG. 3b.

FIGS. 3a-3b present an exemplary embodiment of an arrangement of a plurality of sole molds 300 according to the invention. FIG. 3a presents the top parts 340 as well as the side walls 330 and FIG. 3b presents the bottom parts 345 of the sole molds 300. Each of the sole molds 300 may comprise one or more of the above explained features of the embodiment in FIGS. 2a-2c.

Combining several sole molds 300 may allow to automatically manufacture a plurality of shoe soles including e.g. a midsole and an outsole in one single process. The aforementioned advantages of the sole molds according to the invention may thus be upscaled to any plurality as required for a cost and energy efficient sole production. More specifically, the infrastructure to supply the sole molds 300 with the gaseous and/or liquid medium may be shared among several sole molds 300. For example, the gaseous and/or liquid medium may be supplied by one or more common channels leading to the second openings in the top parts 340 and/or the bottom parts 345 and/or the side walls 330 of each mold. Similarly, heating and cooling units may be shared for several molds in the arrangement of FIGS. 3a and 3b. This may further reduce the overall costs for the automated manufacture of a large number of soles.

In the following, further embodiments are described to facilitate the understanding of the invention:

1. A sole mold for manufacturing a sole from a plurality of particles comprising:
   a. at least one first opening for supplying the particles;
   b. at least two second openings for supplying a gaseous and/or liquid medium to bond and/or fuse the particles together;
   c. wherein at least a portion of the sole mold is manufactured by an additive manufacturing method.

2. The sole mold of embodiment 1, wherein at least one dimension of each of the at least two second openings is smaller than the average size of the particles to be molded in the sole mold.

3. The sole mold of embodiment 1 or 2, wherein the second openings are provided with a smallest dimension of up to 5.0 mm, preferably of up to 4.0 mm, preferably up to 3.0 mm and more preferably 0.1 mm to 1 mm.

4. The sole mold of one of the embodiments 1-3, wherein at least a portion of sole mold comprises a thickness of equal or less than 10 mm, preferably equal or less than 6 mm and more preferably equal or less than 3 mm.

5. The sole mold of embodiment 4, wherein the portion is provided in the side wall of the sole mold.

6. The sole mold of embodiment 4 or 5, wherein the portion comprises essentially the complete mold.

7. The sole mold of one of the preceding embodiments, wherein the sole mold comprises a top part, a bottom part and a side wall, wherein second openings are provided in the side wall.

8. The sole mold of embodiment 7, wherein second openings are further provided in the top part, the bottom part and the side wall.

9. The sole mold of one of the preceding embodiments, further comprising at least one recess and/or at least one projection to position a pre-manufactured outsole.

10. The sole mold of embodiment 9, wherein second openings are arranged adjacent to the at least one recess and/or at least one projection.

11. The sole mold of one of the preceding embodiments, wherein the second openings are arranged in an essentially regular pattern.

12. The sole mold of one of the preceding embodiments, further comprising a means for closing the at least one first opening.

13. The sole mold of one of the preceding embodiments, further comprising a means for holding a supporting element inside the mold.

14. The sole mold of the preceding embodiment, wherein the mold comprises a means for ejecting a manufactured sole from the sole mold.

15. An arrangement of a plurality of sole molds according to one of the preceding embodiments.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A sole mold for manufacturing a sole from a plurality of particles comprising:
   at least one first opening for supplying the particles; and
   at least two second openings for supplying at least one of a gaseous medium and a liquid medium to perform at least one of bonding and fusing the particles together;
   wherein at least a portion of the sole mold comprising the at least two second openings is manufactured by an additive manufacturing method; and
   wherein the at least two second openings have a largest dimension smaller than the average size of the particles to be molded in the shoe mold.

2. The sole mold of claim 1, wherein the at least two second openings have a smaller length than an average size of the particles to be molded in the sole mold.

3. The sole mold of claim 1, wherein the largest dimension of the second openings is equal to or less than approximately 5.0 mm.

4. The sole mold of claim 1, wherein the largest dimension of the second openings is equal to or less than approximately 4.0 mm.

5. The sole mold of claim 1, wherein the largest dimension of the second openings is equal to or less than approximately 3.0 mm.

6. The sole mold of claim 1, wherein the largest dimension of the second openings is from approximately 0.1 mm to 1.0 mm.

7. The sole mold of claim 1, wherein at least a portion of the sole mold comprises a thickness equal to or less than approximately 10 mm.

8. The sole mold of claim 1, wherein at least a portion of the sole mold comprises a thickness equal to or less than approximately 6 mm.

9. The sole mold claim 1, wherein at least a portion of sole mold comprises a thickness equal to or less than approximately 3 mm.

10. The sole mold of claim 7, wherein the portion is provided in a side wall of the sole mold.

11. The sole mold of claim 7, wherein the portion comprises substantially the complete sole mold.

12. The sole mold of claim 1, wherein the sole mold further comprises a top part, a bottom part and a side wall, wherein the at least two second openings are provided in the side wall.

13. The sole mold of claim 12, wherein the at least two second openings are further provided in the top part and the bottom part.

14. The sole mold of claim 1, further comprising at least one of at least one recess and at least one projection to position a pre-manufactured outsole.

15. The sole mold of claim 14, wherein the at least two second openings are arranged adjacent to at least one of the at least one recess and the at least one projection.

16. The sole mold of claim 1, wherein the at least two second openings are arranged in a substantially regular pattern.

17. The sole mold of claim 1, further comprising a means for holding a supporting element inside the sole mold.

18. The sole mold of claim 1, further comprising a means for ejecting a manufactured sole from the sole mold.

19. An arrangement of a plurality of sole molds according to claim 1.

* * * * *